US007009946B1

(12) United States Patent
Kardach (10) Patent No.: US 7,009,946 B1
(45) Date of Patent: Mar. 7, 2006

(54) METHOD AND APPARATUS FOR MULTI-ACCESS WIRELESS COMMUNICATION

(75) Inventor: James Kardach, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 761 days.

(21) Appl. No.: 09/599,322

(22) Filed: Jun. 22, 2000

(51) Int. Cl.
*H04B 7/00* (2006.01)

(52) U.S. Cl. .................................. 370/310; 379/93.01

(58) Field of Classification Search ................. 370/310, 370/338, 352, 353, 401, 901, 908, 913; 379/90.01, 379/93.01, 100.01; 455/517, 518
See application file for complete search history.

(56) References Cited

U.S. PATENT DOCUMENTS

| | | | |
|---|---|---|---|
| 5,666,487 A * | 9/1997 | Goodman et al. .......... 709/246 |
| 5,812,786 A * | 9/1998 | Seazholtz et al. .......... 709/233 |
| 6,041,114 A * | 3/2000 | Chestnut ................ 379/211.02 |
| 6,058,169 A * | 5/2000 | Bramnick et al. ...... 379/100.01 |
| 6,069,899 A * | 5/2000 | Foley ......................... 370/494 |
| 6,229,810 B1 * | 5/2001 | Gerszberg et al. .......... 370/401 |
| 6,237,054 B1 * | 5/2001 | Freitag, Jr. ................... 710/72 |
| 6,246,695 B1 * | 6/2001 | Seazholtz et al. .......... 370/468 |
| 6,389,005 B1 * | 5/2002 | Cruickshank ............... 370/352 |
| 6,404,764 B1 * | 6/2002 | Jones et al. ................. 370/352 |
| 6,404,861 B1 * | 6/2002 | Cohen et al. ............. 379/93.01 |
| 6,404,874 B1 * | 6/2002 | Chestnut ................ 379/211.02 |
| 6,424,653 B1 * | 7/2002 | Arsikere et al. ............ 370/401 |
| 6,470,189 B1 * | 10/2002 | Hill et al. ................... 455/517 |

OTHER PUBLICATIONS

"Intel Announces Industry's First Single-Chip Silicon Solution For Home Networking" www.intel.com/pressroom/archive/releases/Hn091598.htm, May 4, 2000.
"Intel AnyPoint Home Network" www.intel.com/anypoint/index.htm. May 4, 2000.
"Motorola Licenses Tut Networking Technology" www.nwfusion.com/news/1203motorola.html May 4, 2000.
"Tut Inks Deals With Intel, National". http://news.cnet.com/news/0-1003-200-333215.html. May 4, 2000.
"Home Networking: Here But Yet So Far".http://news.cnet.com/news/0-1003-200-333215.html. May 4, 2000.
"1999: The Year For Home Networking?" http://news.cnet.com/news/0-1003-200-333215.html. May 4, 2000.
"The Pharoah Of Home Networking" http://news.cnet.com/news/0-1003-200-333215.html. May 4, 2000.

* cited by examiner

*Primary Examiner*—John Pezzlo
*Assistant Examiner*—Dmitry Levitan
(74) *Attorney, Agent, or Firm*—Blakely, Sokoloff, Taylor & Zafman LLP (57) ABSTRACT

According to one embodiment of the invention, an apparatus is provided that includes a network circuit to be coupled to a local area network (LAN) through a transmission line. The transmission line to serve as wiring for the LAN. The apparatus also includes a modem to be coupled to a wide area network (WAN) through the transmission line. Additionally, the apparatus includes a digital-to-analog (D/A) converter to be coupled to a telephone network through the transmission line. Moreover, the apparatus includes a radio transceiver coupled to the network circuit, the modem and the D/A converter. The radio transceiver to receive wireless communication data and to route the wireless communication data to at least one device on the LAN, the WAN or the telephone network through the network circuit, the modem or the D/A converter, respectively.

22 Claims, 6 Drawing Sheets

METHOD AND APPARATUS FOR MULTI-ACCESS WIRELESS COMMUNICATION

FIELD

The invention relates to communications. More specifically, the invention relates to a method and apparatus for multi-access wireless communication.

BACKGROUND

With the widespread expansion of both wired and wireless telecommunications, a litany of wired and wireless computing devices have been developed. One example of the expansion of wired telecommunications can now be seen in family homes. In particular, many homes have multiple wired computing devices (e.g., computers, printers, etc.), which has increased home networking in order to couple such devices together. Currently, one type of technology has been developed to enable home networking of devices through employment of the ordinary telephone lines already in homes today without interfering with ordinary telephone service. In particular, such technology maps an Ethernet technology on top of the existing telephone wiring in the home. Accordingly, the signals for this data network are at a frequency that does not interfere with the frequency for voice on the telephone lines. Moreover, many such wired computing devices are coupled to larger networks (e.g., wide area networks such as the Internet) to communicate with remote servers and computers.

With regard to wireless telecommunications, wireless-computing devices have been developed, which include cellular telephones, wireless modems on computers and personal digital assistants (PDAs). As a result of the number of wireless devices, BLUETOOTH™ technology has been developed to standardize short-range radio communications among such wireless devices. The BLUETOOTH™ technology includes a standard for short-range transmission of digital voice and data, which has been defined and formalized by the BLUETOOTH™ Special Interest Group whose members include INTEL® and IBM®. Moreover, the standards for BLUETOOTH™ have been promulgated in "Specification of the Bluetooth™ System", Version 1.0B, December, 1999.

However, while wired and wireless telecommunications continues to expand, currently, there is a lack of integration of multiple wireless and wired devices in order to provide for connectivity among such devices.

BRIEF DESCRIPTION OF THE DRAWINGS

Embodiments of the invention may be best understood by referring to the following description and accompanying drawings which illustrate such embodiments. In the drawings.

DETAILED DESCRIPTION

In the following description, numerous specific details are set forth to provide a thorough understanding of the invention. However, it is understood that the invention may be practiced without these specific details. In other instances, well-known structures and techniques have not been shown in detail in order not to obscure embodiments of the present invention.

Figure 1:
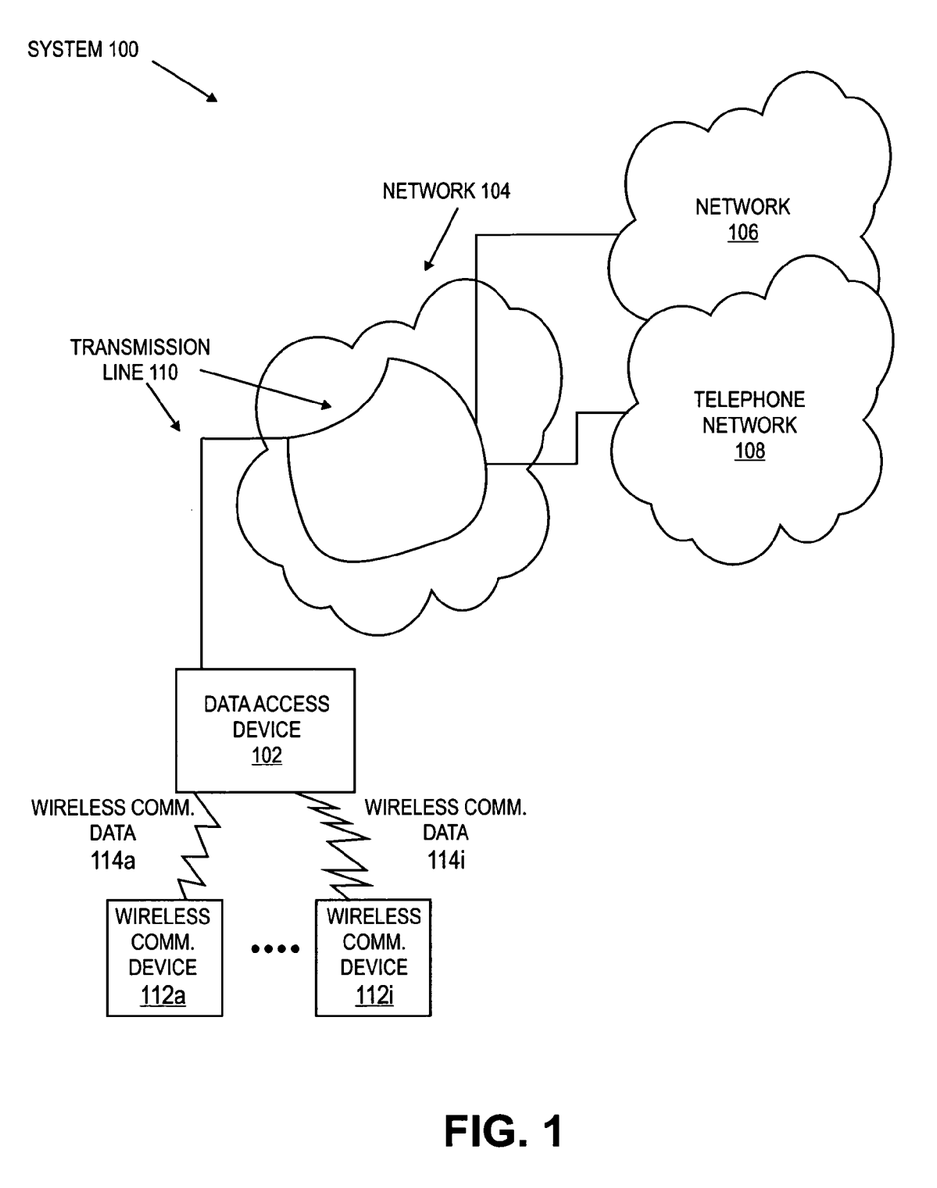
FIG. 1 is a block diagram illustrating a system incorporating embodiments of the present invention.

FIG. 1 is a block diagram illustrating a system incorporating embodiments of the present invention. In particular, FIG. 1 includes system 100, which includes data access point device 102, network 104, network 106 and telephone network 108. Transmission line 110 couples data access device 102 to network 104. Moreover as shown, transmission line 110 serves as the wiring of network 104 coupling together multiple computing devices together therein. System 100 also included wireless communication devices 112*a–i*, which transmit and receive data to and from networks 104–108 and devices coupled thereto through data access device 102. In particular, wireless communication devices 112*a–i* communicate wireless communication data 114*a–i*, respectively to data access device 102. In one embodiment, wireless communication devices 114*a–i* include cellular telephones, wireless modems on computers and PDAs.

In an embodiment, data access device 102 and wireless communication devices 112*a–i* employ a BLUETOOTH™ technology for communication between one another, which is a technology to standardize short-range radio communications among wireless communication devices. Telephone network 108 includes telephony equipment (e.g., a central office switch) to transport voice and data to different devices (e.g., telephones, fax machines, etc.) coupled to telephone network 108. As illustrated, network 106 and telephone network 108 overlap as devices of each network can be employed by both networks. For example, a telephone switch in telephone network 108 could also be used to transmit network data traffic for network 106.

While different embodiments of system 100 can have different networks therein, in one embodiment network 104 is a local area network (LAN) and network 106 is a wide area network (WAN). In one such embodiment, network 106 is the Internet. In an embodiment, network 104 is a network wherein multiple network devices (e.g., computers, printers, etc.) can be coupled together through Plain Old Telephone Service (POTS) lines without interrupting ordinary telephone service therein. In one such embodiment, this network is located in a residential home such that multiple computing devices are coupled together. Accordingly, in such an embodiment, transmission line 110 is a POTS line.

Moreover as shown, network 104 can be coupled to network 106 for the transmission of network traffic (e.g., Internet data). Further, telephone network 108 is also coupled to transmission line 110 to provide typical telephone service for telephonic-devices (e.g., telephone, fax, etc.) coupled to transmission line 110.

Additionally, because different types of traffic are being transmitted along transmission line 110, such traffic needs to remain segregated. In particular in an embodiment, the different types of traffic include voice as well as data traffic being uploaded to and downloaded from different devices on networks 104–108. Accordingly, FIG. 2 is a diagram of frequency versus amplitude for voice and data being transmitted on transmission line 110 within network 104, according to one embodiment of the invention.

Figure 2:
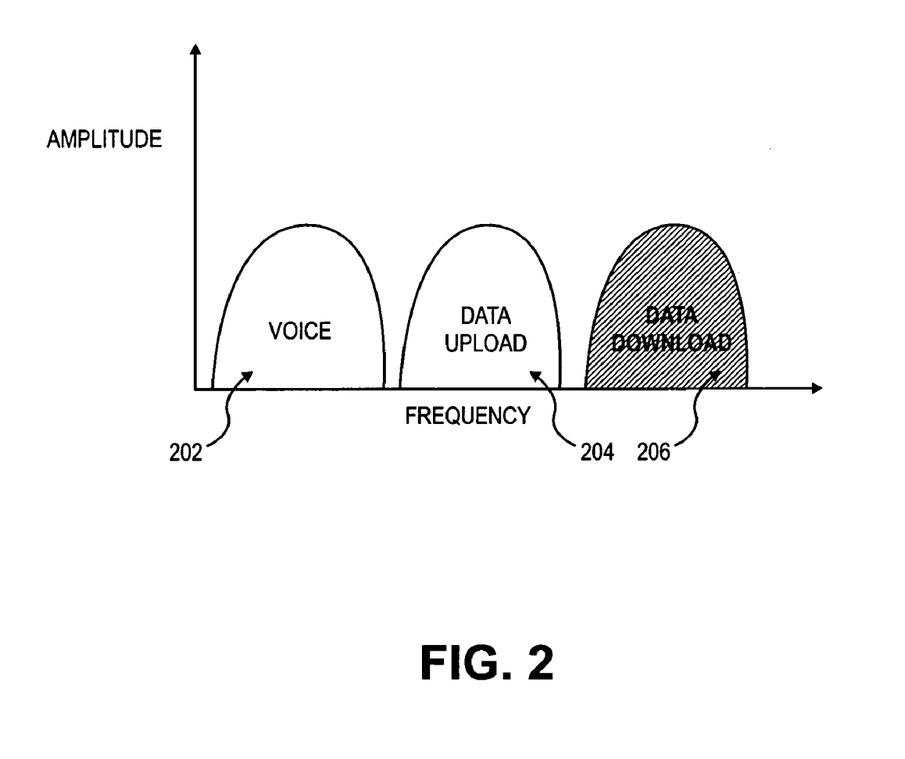
FIG. 2 is a diagram of frequency versus amplitude for voice and data being transmitted on transmission line 110 within network 104, according to one embodiment of the invention.

The frequency diagram of FIG. 2 includes voice frequency range 202, data upload frequency range 204 and data download frequency range 206. As shown, voice frequency range 202, data upload frequency range 204 and data download frequency range 206 are at different frequency ranges, thereby allowing for the incorporation of voice, upload data as well as download data along a single transmission line without interference of such voice and data with each other. However, the frequency diagram of FIG. 2 is by way of illustration and not by way of limitation as other frequency configurations may be incorporated into embodiments of the invention. For example, in another embodiment, data upload frequency range 204 and data download frequency range 206 are switched.

Figure 3:
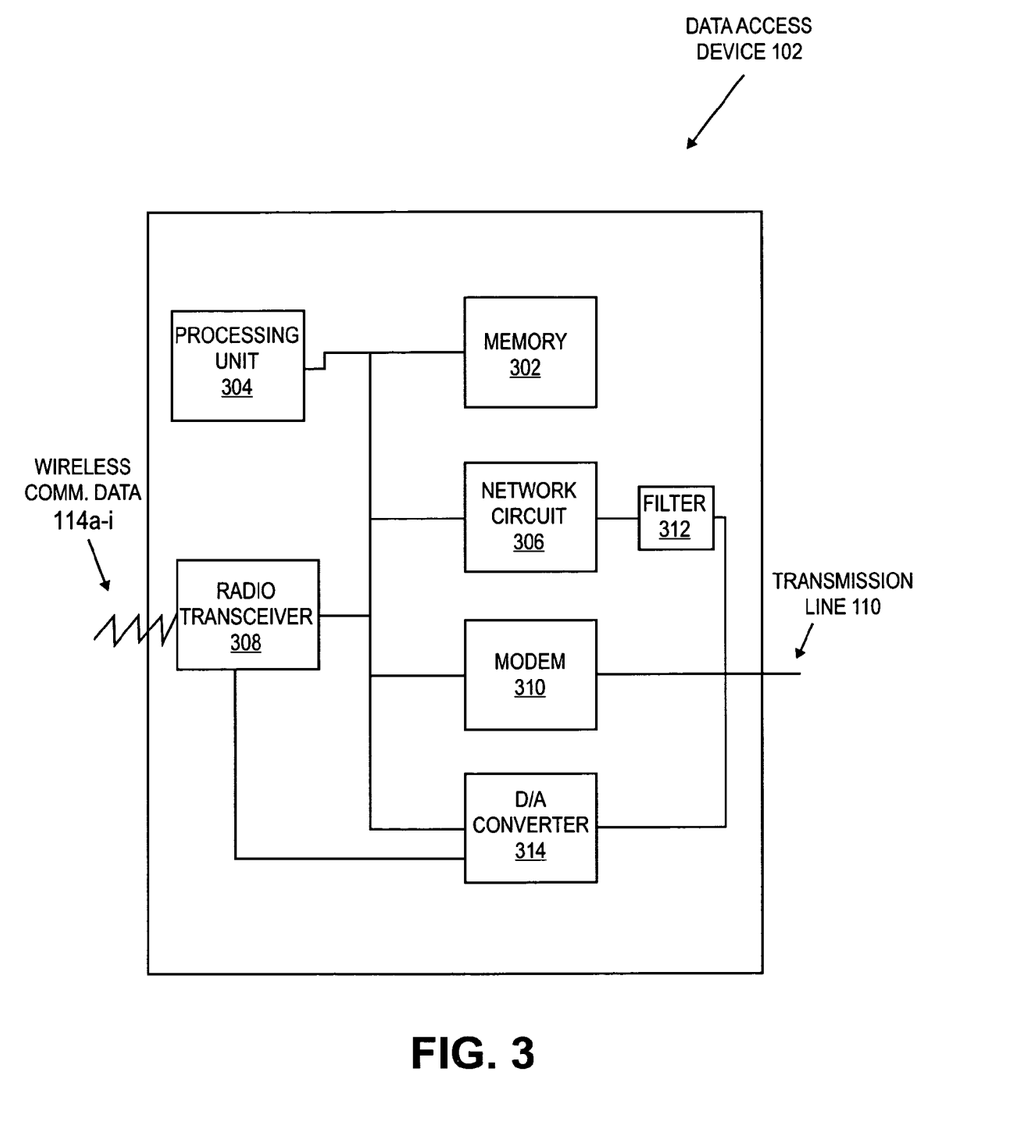
FIG. 3 illustrates a block diagram of data access device 102 of FIG. 1 according to one embodiment of the present invention.

Data access device 102 acts as a router such that data received therein is transported to the appropriate networks and devices. FIG. 3 illustrates a block diagram of data access device 102 of FIG. 1 according to one embodiment of the present invention. Data access device 102 includes memory 302, processing unit 304, network circuit 306, radio transceiver 308, modem 310, digital-to-analog (D/A) converter 314 and filter 312. Data access device 102 is coupled to transmission line 110 as previously described in FIG. 1.

Processing unit 304 can be any of a variety of different types of processing units. In one embodiment, processing unit 304 is an embedded processing unit internal to data access device 102, as illustrated in FIG. 3. However, embodiments of the invention are not so limited as processing unit 304 can also be external to data access device 102 in alternative embodiments. Moreover, memory 302 can be a variety of different types of memories. In one embodiment, memory 302 is a random access memory (RAM). However, embodiments of the invention are not so limited as memory 302 can be other type of memory. Further, memory 302 is shown in FIG. 3 as being embedded into data access device 102. However, alternative embodiments of the invention can have memory 302 external to data access device 102.

Additionally, data access device 102 is capable of transmitting and receiving wireless communication data 114a–i through radio transceiver 308. In one embodiment, radio transceiver 308 is a BLUETOOTH™ access device for transmitting and receiving BLUETOOTH™ data to and from wireless communication devices. Moreover, while data access device 102 can be coupled to transmission line 110 through different means, in one embodiment in which transmission line 110 is a POTS line, data access device 102 is coupled to transmission line 110 through a single RJ-11 socket (i.e., POTS phone jack).

In operation, data access device 102 receives wireless communication data 114a–i from wireless communication devices 112a–i and routes such data to various devices coupled to network 104, network 106 and telephone network 108. Additionally, data access device 102 receives wired communications data from devices coupled to networks 104–108 through transmission line 110 and routes such data to wireless communication devices 112a–i.

Figure 4:
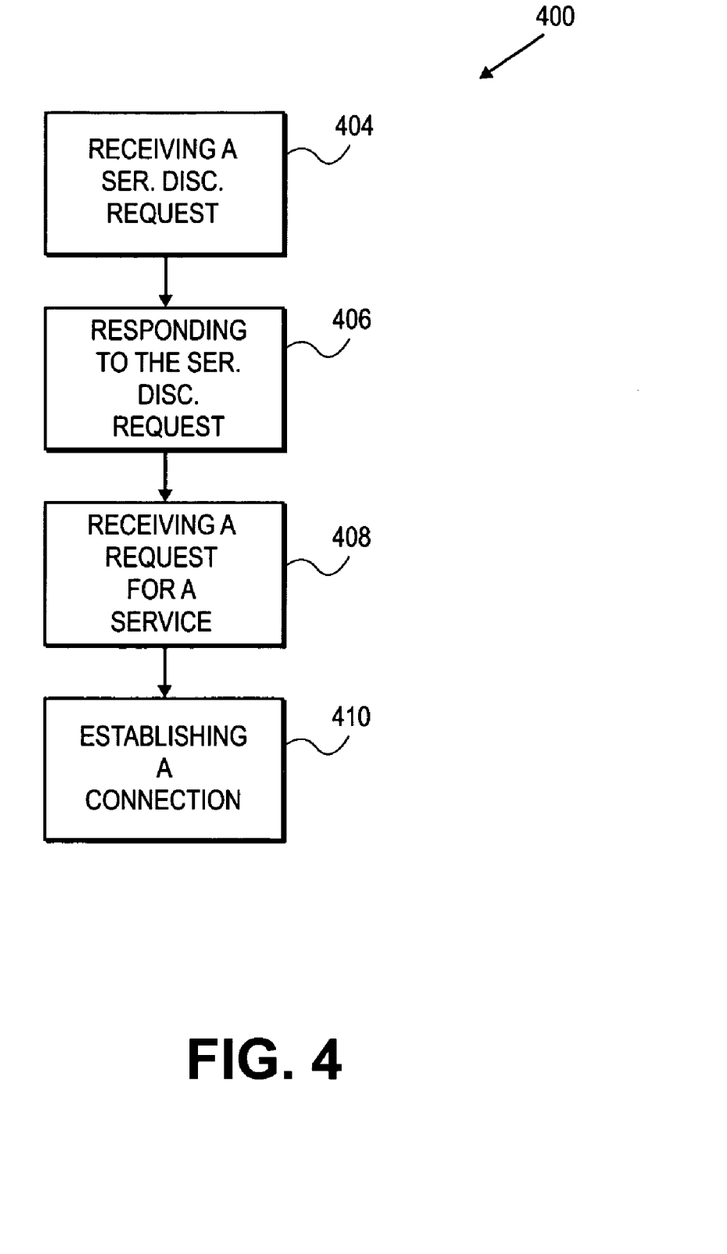
FIG. 4 is a flowchart illustrating one embodiment of a method for forming a connection between a wireless communication device and a device coupled to networks 104–108.

Prior to this routing, a connection is established between a given wireless communication device and a device coupled to network 104, network 106 or telephone network 108 through data access device 102. FIG. 4 is a flowchart illustrating one embodiment of a method for forming a connection between a wireless communication device and a device coupled to networks 104–108.

Method 400 commences when radio transceiver 308 receives a service discovery request in the form of wireless communication data 114a–i from one of wireless communication devices 112a–i at block 404. This service discovery request enables wireless communication devices 112a–i to determine what services are available in their given broadcast area. Such a service discovery request is not limited to a general broadcast for all of the different services available, as other types of service discovery requests can be transmitted from wireless communication devices 112a–i. For example, wireless communication devices 112a–i can transmit a service request that searches for a specific service with or without specific service attributes. In one such example, wireless communication devices 112a–i could transmit a service discovery request for dial-up networking through a specific type of modem.

Data access device 102 responds to the service discovery request with another wireless communication data 114a–i to the requesting wireless communication device 112a–i, indicating that data access device 102 includes three services at block 406. In particular, the services provided by data access device 102 include (1) a cordless telephony service, (2) a dial-up networking service and (3) a network (e.g. LAN) access service.

The requesting wireless communication device 112a–i requests one of the three services from data access device 102 at block 408. Accordingly, a link is established between the requesting wireless communication device 112a–i and data access device 102, thereby establishing a connection between these two devices for a given communications session at block 410. Further, each service establishes a different type of connection which has a profile that defines the protocols and procedures. For example, a cordless telephony service is defined by a cordless telephony profile which can establish a cordless telephony connection.

Moreover, multiple links and/or connections can be established between data access device 102 and multiple wireless communication devices 112a–i. For example, data access device 102 could be communicating with a first computer (e.g., desktop or laptop) to establish a dial-up networking connection with a dialup Internet access server in order to connect to devices on network 106 (e.g., the Internet) through modem 310. Simultaneously, data access device 102 could be communicating with the first computer or a second computer to establish a network access connection with network devices (e.g., computers, printers, etc.) coupled to network 104. Moreover, data access device 102 could be simultaneously communicating with a cellular telephone to establish a cordless telephony connection with a telephone coupled to telephone network 108.

Figure 5:
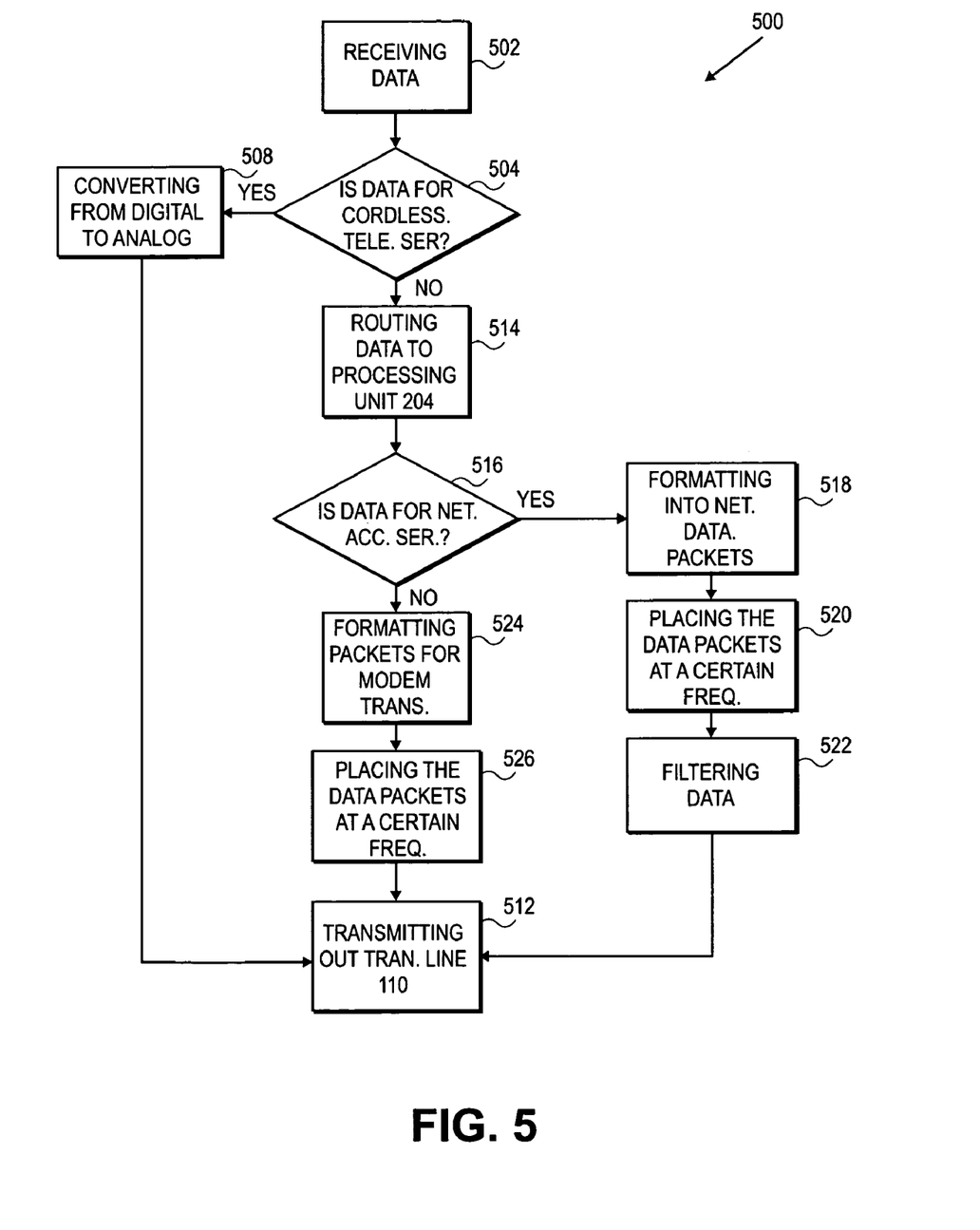
FIG. 5 is a flowchart illustrating one embodiment of a method for the receipt and routing of data from wireless communication devices.
Figure 6:
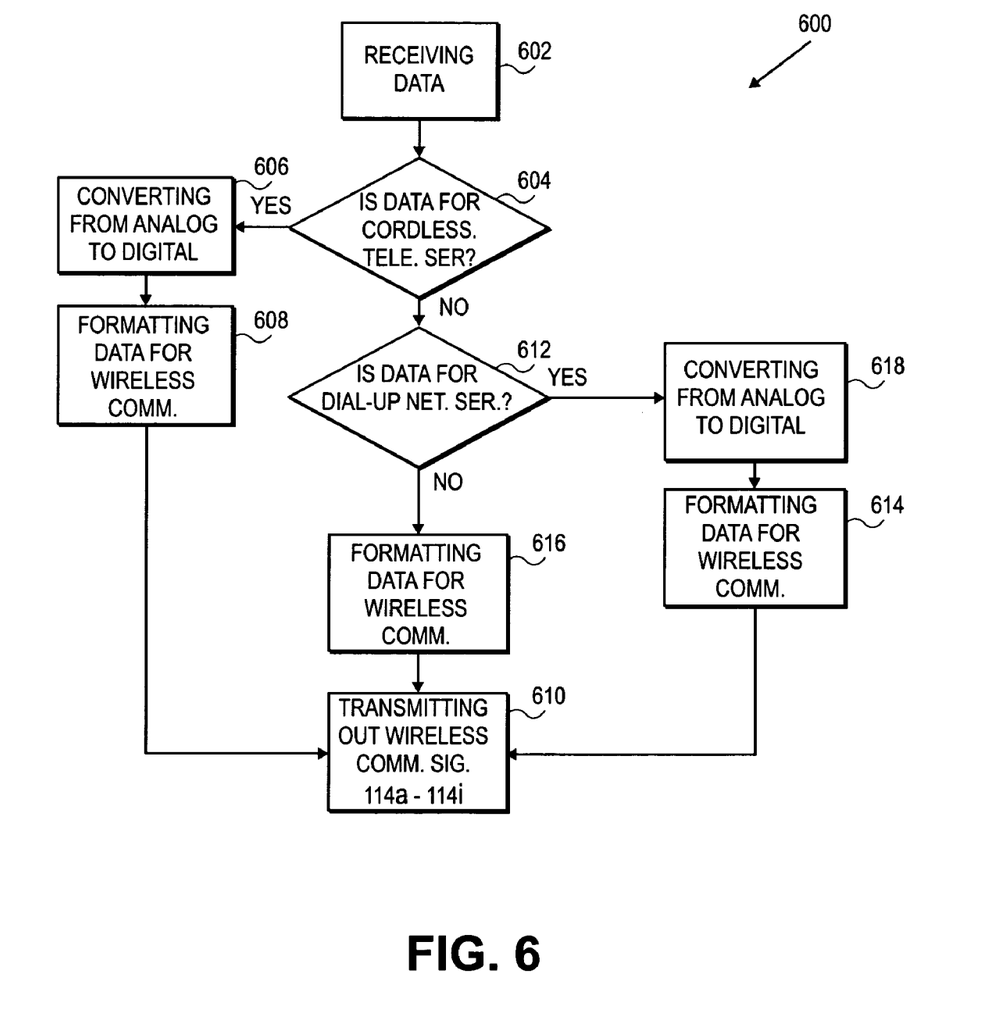
FIG. 6 is a flowchart illustrating one embodiment of a method for the receipt and routing of data from devices coupled to networks 104–108.

Because multiple connections can be established from the same or multiple wireless communication devices 112a–i, data access device 102 routes the data to a designated location based on the type of connection (e.g., dial-up networking connection) from which data is received. This routing by data access device 102 will now be described within the context of method 500 and method 600, according to embodiments of the present invention. In particular, FIG.

5 is a flowchart illustrating one embodiment of a method for the receipt and routing of data from wireless communication devices.

Method 500 commences when radio transceiver 308 receives data from one of wireless communication devices 112a–i at block 502. Upon receipt of the data, radio transceiver 308 determines if the data is from a cordless telephony connection for cordless telephony service at decision block 504. If the data is from such a connection, radio transceiver 308 routes the data to D/A converter 314. D/A converter 314 converts the data from a digital to an analog format at block 508. D/A converter 314 then transmits this data out transmission line 110 to the designated device on telephone network 108 at block 512. The frequency range for this analog data on transmission line 110 is within a voice frequency range, as illustrated in FIG. 2. In one embodiment, the voice frequency is 0–4 kiloHertz. Accordingly, this analog data is transmitted through transmission line 110 to the designated device within telephone network 108 (e.g., the telephone having the telephone number dialed by a cordless telephone). In one embodiment, wireless communication device 112a is a cellular telephone employing BLUETOOTH™ technology for voice transmission via the POTS telephone line.

If the data is not for a connection for a cordless telephony service, radio transceiver 308 routes such data to processing unit 304 at block 514. Processing unit 304 determines whether the data is from a network access connection for a network access service or a dial-up network connection for a dial-up networking service at decision block 516. If the data is from a network access connection, processing unit 304 formats the data into network data packets (e.g., point-to-point protocol (PPP) packets) and routes these network data packets to network circuit 306 at block 518. Network circuit 306 places these data packets at a frequency that is different than a voice frequency and transmits these data packets to filter 312 at block 520. In an embodiment employing the frequency diagram of FIG. 2, these data packets are placed in data upload frequency range 204. Filter 312 removes the frequency levels not associated with the frequency for the data packets at block 522. In one embodiment, filter 312 is a high-pass filter. Filter 312 then transmits this data out transmission line 110 to the designated device on network 104 at block 512.

If the data is not from a network access service connection for a network access service, such data is from a dial-up networking connection for a dial-up networking service. Accordingly at block 524, processing unit 304 formats the data into standard data packets for modem transmission and routes these data packets to modem 310. Modem 310 converts this data from an analog to a digital format and places this data at a certain frequency range. In an embodiment employing the frequency diagram of FIG. 2, this data is placed in voice frequency range 202. Modem 310 can be any of a variety of different types of modem, as are known in the art, with different transmission speeds associated therewith. Modem 310 then transmits this data to the designated device on network 106 through transmission line 110 at block 512.

FIG. 6 is a flowchart illustrating one embodiment of a method for the receipt and routing of data from devices coupled to networks 104–108. Method 600 commences when data is received at data access device 102 from transmission line 110 at block 602. Data access device 102 determines whether the data is a cordless telephony connection for a cordless telephony service at decision block 604.

In an embodiment employing the frequency diagram of FIG. 2, this data is placed in voice frequency range 202.

If the data is associated with a cordless telephony connection, such data is received by D/A converter 314. D/A converter 314 converts the data from an analog to a digital format at block 606 and routes such data to radio transceiver 308. D/A converter 314 then routes this data to radio transceiver 308. Radio transceiver 308 formats the data for wireless communication at block 608. Radio transceiver 308 then transmits this data as wireless data 114a–i to one of wireless communication devices 112a–i through the established connection between such a wireless communication device and data access device 102 at block 610.

If the data is not associated with a cordless telephony connection, data access device 102 determines whether such data is for a dial-up networking connection for a dial-up networking service at decision block 612. If the data is associated with a dial-up networking connection, such data is received by modem 310. Modem 310 then converts the data from an analog to a digital format and routes the data to processing unit 304 at block 618. In an embodiment, the data associated with the connections for a dial-up networking service has approximately the same frequency range as the data for the cordless telephony service. In one such embodiment employing the frequency diagram of FIG. 2, this data is placed in voice frequency range 202. Processing unit 304 in conjunction with radio transceiver 308 formats this data for wireless communication at block 614. Radio transceiver 308 then transmits this data as wireless data 114a–i to one of wireless communication devices 112a–i through the established connection between such wireless communication device and data access device 102 at block 610.

If the data is not associated with a dial-up networking connection, such data is for a network access connection for network access service and is received by networking circuit 306 and routed to processing unit 304. In an embodiment, the frequency range of the data associated with the connections for a network access service is different than a frequency range of the cordless telephony service and the dial-up networking service. In one such embodiment employing the frequency diagram of FIG. 2, this data is placed in data download frequency range 206. Processing unit 304 in conjunction with radio transceiver 308 formats this data for wireless communication through the established connection to the designated device at block 616. Radio transceiver 308 then transmits this data as wireless data 114a–i to one of wireless communication devices 112a–i through the established connection between such wireless communication device and data access device 102 at block 610.

Moreover, the above-described embodiments delineated between voice and data when describing the routing processes. However, embodiments of the invention are not so limited. In particular, in one embodiment, voice packets are not limited to transmission over a cordless telephony service connection and/or through D/A converter 314 of data access device 102. For example, voice packets could be converted to isochronous data to allow for voice-over-internet protocol (IP), thereby transmitting such data over a dial-up network service connection and/or a network access service connection. In one such embodiment, such voice data can be received from a cordless telephone. In another embodiment, such voice data can be received from a computer.

Memory 302 includes a machine-readable medium on which is stored a set of instructions (i.e., software) embodying any one, or all, of the methodologies described above.

Software can reside, completely or at least partially, within memory 302 and/or within processing unit 304. For the purposes of this specification, the term "machine-readable medium" shall be taken to include any mechanism that provides (i.e., stores and/or transmits) information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. An apparatus comprising:
a network circuit to couple to a local area network (LAN) through a transmission line;
a modem to couple to a wide area network (WAN) through the transmission line;
a digital-to-analog (D/A) converter to couple to a telephone network through the transmission line;
a radio transceiver coupled to the network circuit, the modem and the D/A converter, the radio transceiver to receive a service discovery request based on a BLUETOOTH standard from a wireless communication device, to establish a connection to the wireless communication device, to receive wireless communication data from the wireless communication device and to route the wireless communication data through the D/A converter across the telephone network where the wireless communication data is received through a cordless telephony connection, to route the wireless communication data to the WAN through the modem where the wireless communication data is received through a dial-up network connection, to route the wireless communication data to the LAN through the network circuit where the wireless communication data is received through a network access connection.

2. The apparatus of claim 1, wherein the wireless communication data received by the radio transceiver is based on a BLUETOOTH standard, and wherein the radio transceiver is a BLUETOOTH access device for receiving the wireless communication data from the wireless communication device.

3. The apparatus of claim 1, wherein the transmission line is a Plain Old Telephone Service line.

4. The apparatus of claim 1, the wireless communications data is received from a group consisting of a mobile telephone, a mobile computer, and a personal digital assistant.

5. The apparatus of claim 1, wherein the wireless communications data is routed to the D/A converter when the wireless communications data is voice data, wherein the voice data includes data received from the cordless telephony connection.

6. The apparatus of claim 1, wherein the wireless communications data is routed to the modem when the wireless communications data is data being routed to the Internet.

7. An apparatus comprising:
a network circuit to couple to a transmission line, the network circuit to transmit at a first frequency range on the transmission line;
a modem to couple to a wide area network (WAN) through the transmission line, the modem to transmit at a second frequency range on the transmission line;
a digital/analog (D/A) converter to couple to a telephone network through the transmission line, the D/A converter to transmit at the second frequency range on the transmission line; and
a radio transceiver to receive a service discovery request from at least one wireless communication device, to establish a connection to the at least one wireless communication device, to receive wireless communication data based on a BLUETOOTH standard from the at least one wireless communication device, to route the wireless communication data through the D/A converter across the telephone network where the wireless communication data is received through a cordless telephony connection, to route the wireless communication data to the WAN through the modem where the wireless communication data is received through a dial-up network connection, to route the wireless communication data to the LAN through the network circuit where the wireless communication data is received through a network access connection.

8. The apparatus of claim 7, wherein the LAN is located in a residential home.

9. The apparatus of claim 7, wherein the transmission line is a Plain Old Telephone Service line.

10. The apparatus of claim 9, wherein the apparatus is coupled through a RJ-11 socket to the POTS line.

11. The apparatus of claim 9, wherein the wireless communication data is routed to the D/A converter when the wireless communication data includes voice data, wherein the voice data includes data received from the cordless telephony connection.

12. The apparatus of claim 9, wherein the wireless communication data is routed to the modem when the wireless communication data is data being routed to devices coupled to the WAN.

13. The apparatus of claim 9, wherein the wireless communication data is routed to the network circuit when the wireless communication data is data being routed to devices coupled to the LAN.

14. A system comprising:
a processing unit;
a memory;
a network circuit coupled to the processing unit and the memory;
a filter coupled to the network circuit, the filter to couple to a local area network (LAN) through a transmission line,
a modem coupled to the processing unit and the memory, the modem to couple to a wide area network (WAN) through the transmission line;
a digital-to-analog (D/A) converter coupled to the processing unit and the memory, the D/A converter to couple to a telephone network through the transmission line;
a radio transceiver coupled to processing unit, the memory, the network circuit, the modem and the D/A converter, the radio transceiver to receive a service discovery request based on a BLUETOOTH standard from a wireless communication device, to establish a connection to the wireless communication device, to receive wireless communication data and to route the wireless communication data through the D/A converter across the telephone network where the wireless communication data is received through a cordless telephony connection, to route the wireless communication data to the WAN through the modem where the wireless communication data is received through a dial-up network connection, to route the wireless communication data to the LAN through the network circuit where the wireless communication data is received through a network access connection.

15. The system of claim 14, wherein the wireless communication data received by the radio transceiver is based on a BLUETOOTH standard.

16. The system of claim 14, wherein the transmission line is a Plain Old Telephone Service line.

17. A method comprising:
receiving a service discovery request based on a BLUETOOTH standard from at least one wireless communication device;
connecting to the at least one wireless communication device;
receiving wireless communication data from the at least one wireless communication device; and
routing the wireless communication data to at least two devices coupled to at least two different networks.

18. The method of claim 17, wherein the routing is based on connections between the at least one wireless communication device and the at least two devices.

19. A method comprising:
receiving a service discovery request from at least one wireless communication device;
connecting to the wireless communication device;
receiving wireless communication data from the at least one wireless communication device;
formatting the wireless communication data into analog data at a first frequency range upon determining the wireless communication data is for a cordless telephony service;
formatting the wireless communication data into analog data at the first frequency range upon determining the wireless communication data is for a dial-up network service;
formatting the wireless communication data into network data packets at a second frequency range upon determining the wireless communication data is for a network access service; and
transmitting the analog data at the first frequency range and the network data packets at the second frequency range to a number of devices on a number of networks.

20. A machine-readable medium that provides instructions, which when executed by a machine, cause said machine to perform operations comprising:
receiving a service discovery request based on a BLUETOOTH standard from at least one wireless communication device;
connecting to the wireless communication device;
receiving wireless communication data from the at least one wireless communication device; and
routing the wireless communication to at least two devices coupled to at least two different networks.

21. The machine-readable medium of claim 20, wherein the routing is based on connections between the at least one wireless communication device and the at least two devices.

22. A machine-readable medium that provides instructions, which when executed by a machine, cause said machine to perform operations comprising:
receiving a service discovery request from at least one wireless communication device;
connecting to the wireless communication device;
receiving wireless communication data from the at least one wireless communication device;
formatting the wireless communication data into analog data at a first frequency range upon determining the wireless communication data is for a cordless telephony service;
formatting the wireless communication data into analog data at the first frequency range upon determining the wireless communication data is for a dial-up network service;
formatting the wireless communication data into network data packets at a second frequency range upon determining the wireless communication data is for a network access service; and
transmitting the analog data at the first frequency range and the network data packets at the second frequency range to a number of devices on a number of networks.

* * * * *

UNITED STATES PATENT AND TRADEMARK OFFICE
CERTIFICATE OF CORRECTION

PATENT NO. : 7,009,946 B1
APPLICATION NO. : 09/599322
DATED : March 7, 2006
INVENTOR(S) : Kardach It is certified that error appears in the above-identified patent and that said Letters Patent is hereby corrected as shown below:

In column 6, at line 7, delete "D/A converter 314 then routes this data to radio".
In column 6, at line 8, delete first occurrence of "transceiver 308".

Signed and Sealed this

Sixth Day of November, 2007

JON W. DUDAS
*Director of the United States Patent and Trademark Office*